United States Patent
Ripple

(10) Patent No.: US 8,201,637 B2
(45) Date of Patent: Jun. 19, 2012

(54) ON-THE-FLY, REMOTE TILLAGE IMPLEMENT HEIGHT ADJUSTMENT APPARATUS AND METHOD FOR USING SAME

(76) Inventor: James E. Ripple, San Angelo, TX (US)

(*) Notice: Subject to any disclaimer, the term of this patent is extended or adjusted under 35 U.S.C. 154(b) by 1681 days.

(21) Appl. No.: 11/445,435

(22) Filed: Jun. 1, 2006

(65) Prior Publication Data
US 2006/0272833 A1 Dec. 7, 2006

Related U.S. Application Data

(60) Provisional application No. 60/686,665, filed on Jun. 2, 2005.

(51) Int. Cl.
*A01B 41/06* (2006.01)
(52) U.S. Cl. .......................................... 172/2
(58) Field of Classification Search .................. 172/453, 172/540, 542, 551–556, 518, 604, 599, 601, 172/165, 166, 484–488, 2–11; 111/118, 111/63, 66–69, 18, 22
See application file for complete search history.

(56) References Cited

U.S. PATENT DOCUMENTS

| | | | |
|---|---|---|---|
| 4,373,456 A | 2/1983 | Westerfield | |
| 4,381,036 A | 4/1983 | Fardal et al. | |
| 4,423,788 A | 1/1984 | Robinson, Jr. et al. | |
| 4,700,784 A | 10/1987 | Wiebe et al. | |
| 4,721,168 A | 1/1988 | Kinzenbaw | |
| 4,949,536 A * | 8/1990 | Neufeld | 56/13.7 |
| 4,951,944 A * | 8/1990 | Morgan | 473/483 |
| 5,234,060 A | 8/1993 | Carter | |
| 5,346,019 A | 9/1994 | Kinzenbaw et al. | |
| 5,562,165 A | 10/1996 | Janelle et al. | |
| 5,961,573 A | 10/1999 | Hale et al. | |
| 6,318,477 B1 | 11/2001 | Bettin | |
| 6,701,857 B1 | 3/2004 | Jensen et al. | |
| 6,820,699 B1 | 11/2004 | Bettin | |
| 7,032,527 B2 | 4/2006 | Friesen et al. | |
| 7,121,073 B2 * | 10/2006 | Schmidt et al. | 56/249 |
| 7,575,066 B2 * | 8/2009 | Bauer | 172/540 |

* cited by examiner

*Primary Examiner* — Robert Pezzuto

(57) ABSTRACT

The present invention provides for on-the-fly, tillage implement height adjustment. It includes a reversible gearmotor removably attachable to the tillage implement height adjuster. Utilizing the tractor's electrical system as power source for the gearmotor, and by reversing the polarity of the circuit, the present invention can achieve clockwise and counterclockwise motion thus raising and lowering the tillage implement while the farmer stays in the cab of the tractor and continues to farm.

16 Claims, 7 Drawing Sheets

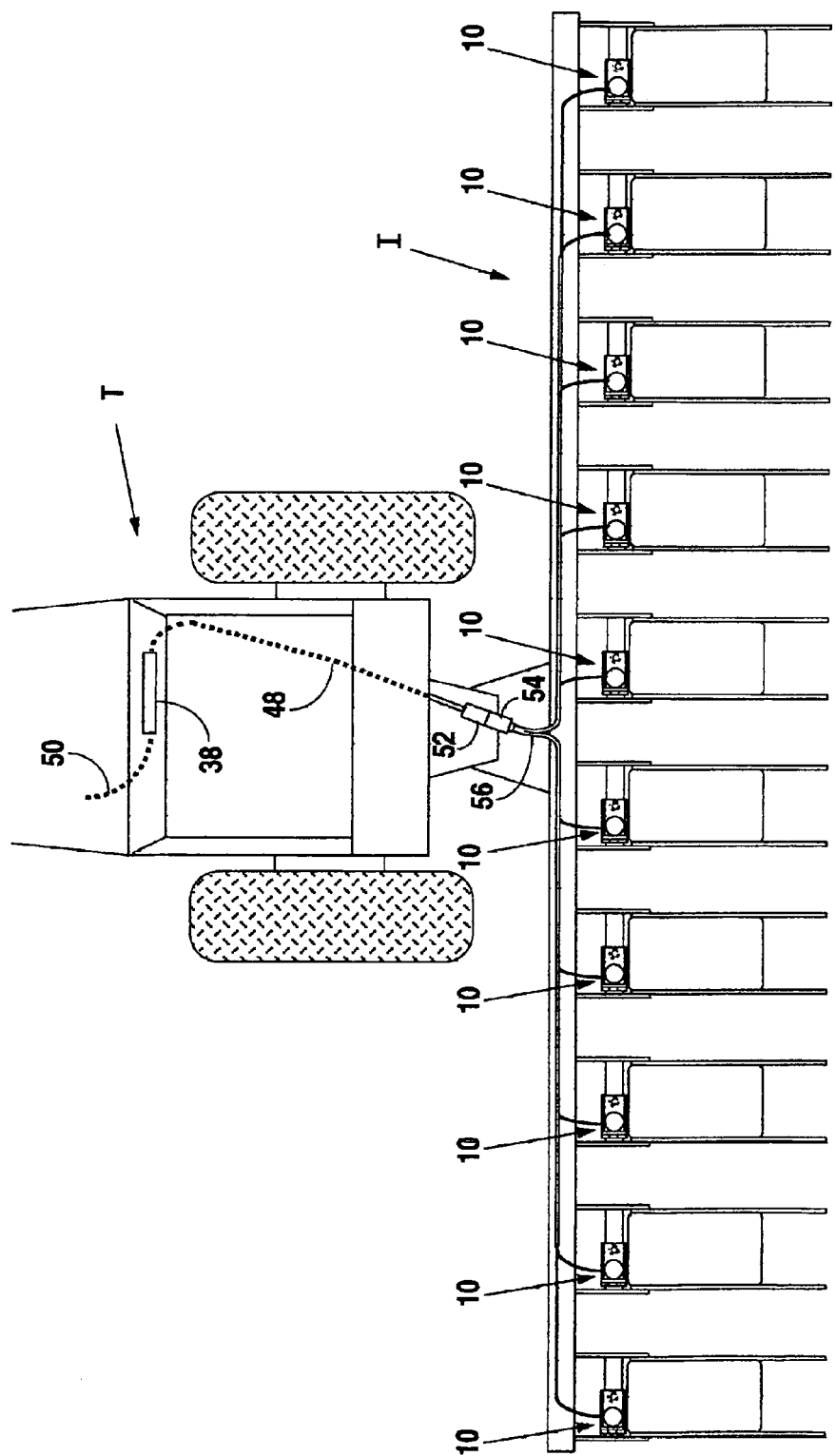

ON-THE-FLY, REMOTE TILLAGE IMPLEMENT HEIGHT ADJUSTMENT APPARATUS AND METHOD FOR USING SAME

This application is based upon and claims priority from U.S. Provisional application Ser. No. 60/686,665 filed Jun. 2, 2005, which is incorporated herein by reference.

BACKGROUND OF THE INVENTION

1. Field of the Invention

Applicants' invention relates to a device for remotely adjusting the height of a tillage implement apparatus while the farm equipment may be moving or stationary.

2. Background Information

In arid and semi-arid areas, such as are found through-out the southwestern United States, farmers are often required to conduct dryland farming, or irrigate their crops. Farmers can make dryland farming successful, but they need a lot of land; one irrigated acre will produce as much crop as several acres farmed dryland. Conversely, irrigating comes with its own cost for the farmer, as well as taking water resources the rights to which are becoming more and more contested as the population swells. Generally speaking, there are many more acres for dryland farming than can be irrigated. However, growers are able to produce more crops on less land by irrigating. But the greatest factor affecting dryland farming is the unpredictability of weather, and particularly the amount of rain. Similarly, "irrigation" cannot be considered a single circumstance, because the amount of irrigation—just like the amount of rain—determines the level of moisture in the soil.

Different crops have specific water needs that can vary. Where one type of crop will do well in drier soil, another will only flourish in well watered soil. But most crops require, or do best, if the seeds are at least planted in soil carrying some degree of moisture. For this reason, farmers generally strip back the top-most soil and left-over crop residue that is dried in the sun and air so that the planter deposits the seeds in moisture containing soil. The farmer will use his experience in an attempt to adjust the tillage implements' height to a point where the tillage implements will lightly contact the soil when the planting units are in planting position.

Modern multi-row planters are often modified with scraping devices, or tillage implements, in order to expose the moist soil that had been below the surface.

The John Deere 7300 planter is used as an example herein.

The John Deere uses a "V-Wing" to move the top layer of soil and residue from a bed to allow the opener to run on a smooth surface and to plant in moist soil. A V-Wing is attached to and moves with the planting unit in front of the unit.

Using an adjusting mechanism, the height of the tillage implement or row unit, for example V-Wing, trash wheel, or the like, can be adjusted in order to skim the ground. The V-Wing frame is attached to the unit parallel arms to provide depth gauging by both the planter frame and the planting unit, thus reducing variations in uneven field conditions. The tillage support bracket has a scale and a pointer to help adjust all of the V-Wings evenly.

To adjust the V-Wing, the farmer must turn the adjustment knob on the tillage support bracket by hand.

Other planter manufacturers use similar tillage implements and adjustment mechanisms to perform the same task.

Conventional tillage implements' height settings are adjusted manually by the tractor operator. Because the adjusters are located on the planter itself, it can require frequent stops to raise or lower the tillage implement ahead of planter units due to changes in soil types and conditions, as well as the characteristics of the field. Because of the large number of acres that many farmers till, frequent stops for adjustments can significantly decrease the number of acres worked per unit of time. This delay is multiplied by the fact that a planter may have several planting units, each with an individual tillage implement whose height must be adjusted. The alternative, not adjusting the tillage implement, is not optimal because of the likely reduction in crop production due to planting in less favorable conditions.

Thus, there is a need for a device to adjust the height of the tillage implements from tractor seat. Further, it is advantageous for such a device to allow for such adjustment on the fly.

SUMMARY OF THE INVENTION

The present invention provides for an on-the-fly tillage implement height adjustment apparatus. The method of the present invention provides for using said apparatus.

The present invention provides a novel apparatus that includes attaching a reversible gearmotor to the tillage implement adjustment knob. Utilizing the tractor's electrical system as power source for the gearmotor. And by reversing the polarity of the circuit, the method, and consequently the user, may achieve clockwise and counterclockwise motion thus raising and lowering the tillage implement.

Many planter units come equipped from the factory with a threaded rod assembly which is used to raise and lower the tillage implement manually. Torque is applied to a handgrip or "knob" to achieve the desired motion. In order to achieve on-the-fly, remote height adjustment of the tillage implement, the current invention is attached to the rotational means of the existing height adjuster via a connection fitting. For example, the center of the John Deere "knob" is formed to accept a ¾" SAE wrench socket. Thus, a design for the exemplified machinery may use a commercially available wrench socket ¾" drive. However, it is anticipated that other farm machinery, and those by other manufacturers, will require other specific connection fittings, all of which are contemplated by the current invention.

In operational communication with the connection fitting is a gear motor. The output shaft of the gearmotor must be shaped and sized to attach to the connection fitting. This attachment may be permanent, or temporary and the connection fitting removably attachable to the output shaft. Having a connection fitting that is removably attachable provides for the substitution of different sized or shaped connection fittings to match various height adjustors. There may be intermediary parts that act to connect the gearmotor to the connection fitting. In the ongoing example, the output shaft of the gearmotor is milled to accept the ¼" square drive of the wrench socket. While the gearmotor may be removably attachable to the connection fitting, it is also desirable that once in use the gearmotor and connection fitting not accidentally disengage. Therefore a locking piece may be employed. In the example, the wrench socket has been drilled and the hole tapped to accept a set screw than will "lock" socket to output gearmotor shaft.

The function of the gearmotor is to activate the tillage implement's adjustment mechanism. In order to effectively implement the present invention, the gearmotor should be of such size and strength in order to be able and activate the tillage implement's adjustment mechanism. The John Deere machine in the example uses rotational movement to raise and lower the V-Wing, therefore the gearmotor must be powerful enough and create enough torque in order to be able and overcome forces that resist activating the tillage implement's adjustment mechanism, such as stiction, friction, weight, foreign particles such as rust and dirt, and the like in order to turn rotate the adjustment mechanism knob. Upon application and depending upon the specific adjustment mechanism, the optimal range of the speed of the gearmotor may be determined and adjusted. Testing on the John Deere equipment revealed that a relatively slow, 12 to 20 revolutions per minute was ideal.

It is also advantageous, although not essential, that the gearmotor assembly be element proof or resistant. This may be accomplished by having the motor and/or gearmotor assembly be resistant in its own right, such as through the used of seals, insulation, and the like, or that it be protected by a shield. Element proofing would help resist the introduction of water, dust, grease, other particulates, and corrosive elements, thereby extending the useful life of the gearmotor assembly.

Power for the present invention may be via a separate power source, or the tractor's 12 VDC electrical supply may be accessed. If the tractor's power supply is to be used, then the present invention's wiring may be routed through an on/off master toggle switch and through a fuse block of ample size to operate the multiplicity of gearmotors simultaneously. In order to effect the rising and lowering of the tillage implement, the gearmotor's operational direction must be switched in order to reverse the adjustment mechanism. The power to the gearmotor switches should have reversing polarity on each side of toggle switch. Therefore, the gearmotor switches should have three positions—de-activated, activated-forward, and activated-reverse. One type of such a switch that may be used is 12 VDC Double Pole-Double Throw (DPDT) Momentary On-Off-Momentary On. It is also contemplated that graduated gearmotor switches could be used, allowing the farmer to increase or decrease the speed of the gearmotors in either activated-forward or activated-reverse positions.

A power cable is run from center poles of each switch to each gearmotor. And the gearmotor switches—generally anticipated to be one switch for each gearmotor, but also contemplated to be a single switch controlling multiple gearmotors—can be mounted in a control box large enough to hold all switches described above. The control box can then be mounted in the cab of the tractor. The cables running from the gearmotors on the farm implement to the control box in the tractor will generally have removably engageable connectors allowing for connection and disconnection of the cables as implements are hooked to and disconnected from the tractor.

BRIEF DESCRIPTION OF THE DRAWINGS

FIG. 4. is a top view of a tractor/implement with multiple height adjustment apparatuses.

FIG. 9. is an exploded view of a representative height adjuster.

Figure 1:
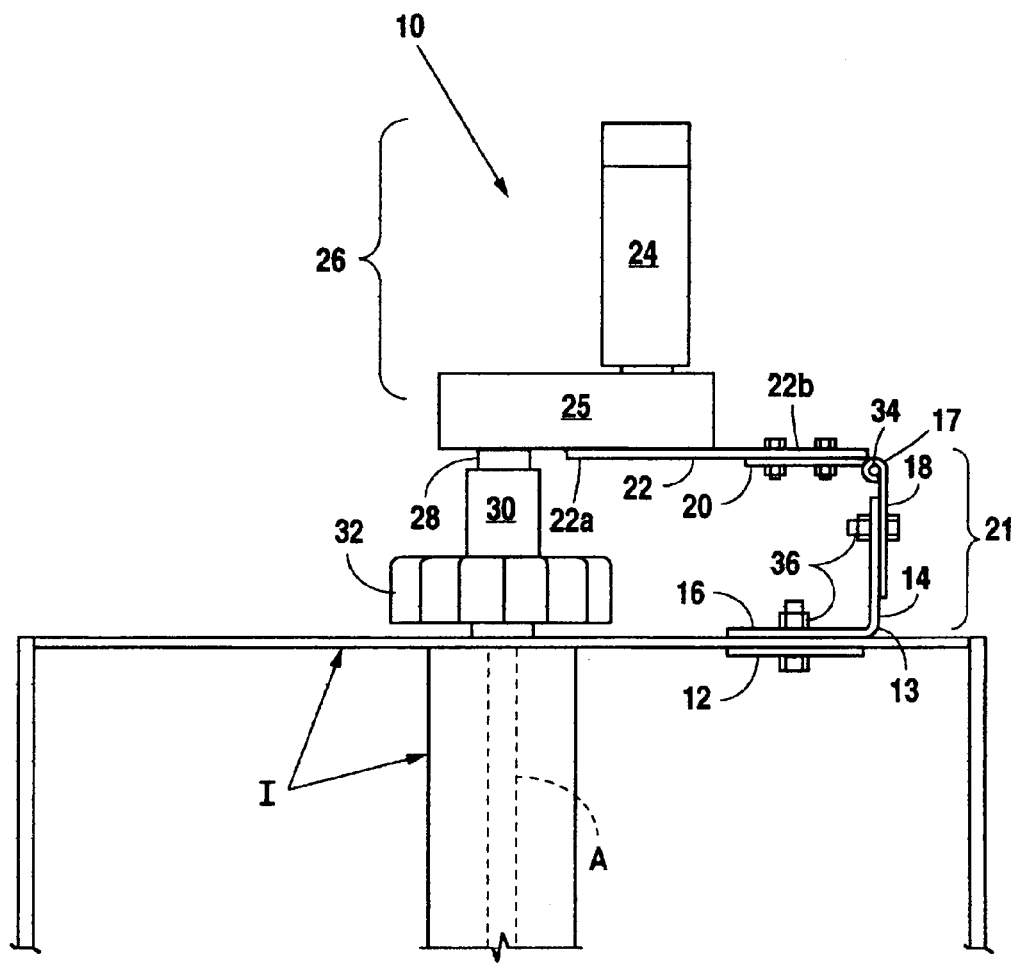
FIG. 1. is a side view of one embodiment of the height adjustment apparatus of the present invention.

DETAILED DESCRIPTION OF
THE PREFERRED EMBODIMENT
Reference Numerals

| | |
|---|---|
| I | implement |
| A | height adjuster |
| T | tractor |
| U | row unit |
| 2 | height adjuster support |
| 4 | adjusting screw |
| 10 | height adjustment apparatus |
| 12 | strap plate |
| 13 | bracket |
| 14 | bracket first side |
| 16 | bracket second side |
| 17 | hinge |
| 18 | hinge first plate |
| 20 | hinge second plate |
| 21 | support assembly |
| 22 | support member, (a) first end, (b) second end |
| 24 | motor |
| 25 | gear case |
| 26 | gearmotor assembly |
| 28 | gearmotor output shaft |
| 30 | connection fitting |
| 32 | knob |
| 34 | pivot |
| 36 | connectors |
| 38 | control box |
| 40 | control switches |
| 42 | power indicator |
| 44 | master switch |
| 46 | status indicator |
| 48 | control cable bundle |
| 50 | power cable |
| 52 | first coupler |
| 54 | second coupler |
| 56 | control cable |
| 100 | power source |
| 110 | switch |
| 120 | fuse block |
| 130 | ground |
| 140 | first gearmotor |
| 150 | second gearmotor |
| 160 | third gearmotor |

| KEY | PART NO. | PART NAME | QTY | SERIAL NO. OR YEAR | REMARKS |
|---|---|---|---|---|---|
| 1 | 19M7387 | CAP SCREW | 2 | | M12 × 40 |
| 2 | A42895 | SPACER | 2 | | |
| 3 | A31867 | LOCK NUT | 4 | | |
| 4 | 34M7172 | SPRING PIN | 1 | | 6 × 30 MM |
| 5 | A52177 | KNOB | 1 | -March 2003 | |
| | A75286 | KNOB | 1 | March 2003- | |
| 6 | A52459 | DETENT | 1 | -March 2003 | |
| | A75509 | DETENT | 1 | March 2003- | |
| 7 | AA37372 | SUPPORT | 1 | | |
| 8 | JD7797 | LUBRICATION FITTING | 1 | | |
| 9 | B32830 | SPRING LOCKING PIN | 2 | | |
| 10 | A52205 | PIN | 1 | | |
| 11 | 19M7414 | CAP SCREW | 1 | -April 1998 | M12 × 90 |
| | 19M8122 | CAP SCREW | 1 | April 1998- | M12 × 85 |
| 12 | 19M7189 | CAP SCREW | 1 | | M12 × 80 |
| 13 | A52199 | ROD | 1 | | |
| 14 | AA37188 | TUBE | 1 | | |
| 15 | A52194 | STUD | 1 | | |
| 16 | A52548 | SPACER | 1 | | |

-continued

| KEY | PART NO. | PART NAME | QTY | SERIAL NO. OR YEAR | REMARKS |
|---|---|---|---|---|---|
| 17 | A52168 | SIGN | 1 | | |
| 18 | 24M7053 | WASHER | 1 | | 17 × 30 × 3 MM |
| — | BA25852 | COMPLETE GOODS/ SHIP. BUNDLE | 1 | | ROW TILLAGE SUPPORT BRACKET |

Referring to the figures, FIG. 1. is a side view of one embodiment of the height adjustment apparatus (10) of the present invention. The height adjustment apparatus (10) is generally comprised of a gearmotor assembly (26) attached to a support assembly (21), which is attached to the implement (I). The height adjustment apparatus (10) is also in communication with control box (38) mounted in the cab of the tractor (T) for access by the user.

In a first embodiment of the present invention, gearmotor assembly (26) is attached to a support assembly (21). The gearmotor assembly (26) is comprised of a motor (24) in operational engagement with a gearcase (25). The motor (24) receives power through a control cable (56) and runs forward or backward dependent upon the polarity of the power received. The motion of the motor is transferred to the gearcase (25) which contains gears and differentials (not shown) that translate the movement of the motor (24) into rotational movement of an associated gearmotor output shaft (28). The gearmotor output shaft (28) is attached to a connection fitting (30) that is engageable with the height adjuster (A) of the implement (I). It is anticipated that the connection fitting (30) will be removably engageable with the gearmotor output shaft (28), allowing for different connection fittings (30), that are engageable with different height adjusters (A), to be attached. A locking device (not shown), such as a set screw, operates with the connection fitting (30) and the gearmotor output shaft (28), and may prevent unintentional disengagement of the connection fitting (30) from the gearmotor output shaft (28).

Forward rotational movement of the gearmotor output shaft (28) causes the height adjuster (A) to lower the row unit (U) of the implement (I), while backward rotational movement of the gearmotor output shaft (28) causes the height adjuster (A) to raise the row unit (U) of the implement (I).

The support assembly (21) provides positioning, support, and attachment for the gearmotor assembly (26). The support member (22) may be comprised of, by way of specific example, a piece of 1/16" to 1/4" thick strap iron measuring approximately 2-5" wide and 4-12" long. The support assembly (21) must be of sufficient size and strength to support the weight of, and the torque created by, the gearmotor assembly (26). The gearmotor assembly (26) is positioned near one end of support member (22) such that a length, determined by the dimensions of the implement (I), is created between gearmotor output shaft (28) and the opposing end of the support member (22). Holes to match a hole pattern on the gear case (25) and output shaft (28) allow use of connectors (36), such as bolts and nuts, to secure the gearmotor assembly (26) to the support assembly (21). The connectors (36) sized to fit the size and thread type of gear case (25) may be used to attach gearmotor assembly (26) to the support member (22). The connectors (36) may also be comprised of other attachment mean such as screws, rivets, welds, adhesives, clamps and the like.

In some instances, it is anticipated that the height adjuster (A) of the implement (I) and the gearmotor assembly will be combined as a single unit, or linear actuator (not shown). The present invention incorporates the use of a linear actuator (not shown).

If a linear actuator (not shown) is used, then it is anticipated that the linear actuator (not shown) would allow for local, manual adjustment of the height of the row unit (U) at the linear actuator (not shown), as well as from the control box (38) via a control switch (40).

Figure 2A:
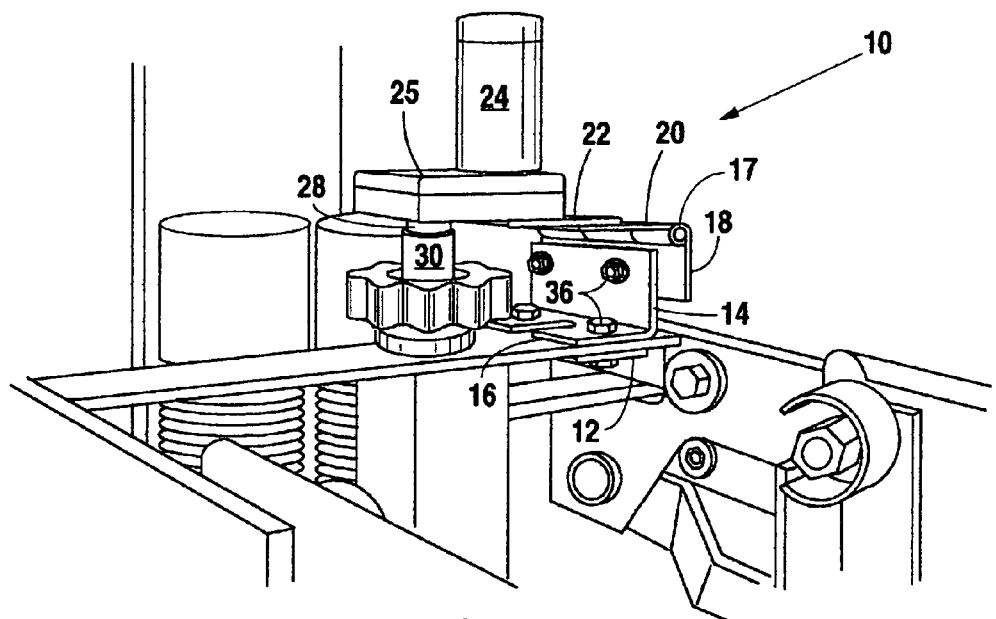
FIG. 2a. is a perspective view of the height adjustment apparatus of the present invention in a first, engaged position.
Figure 2B:
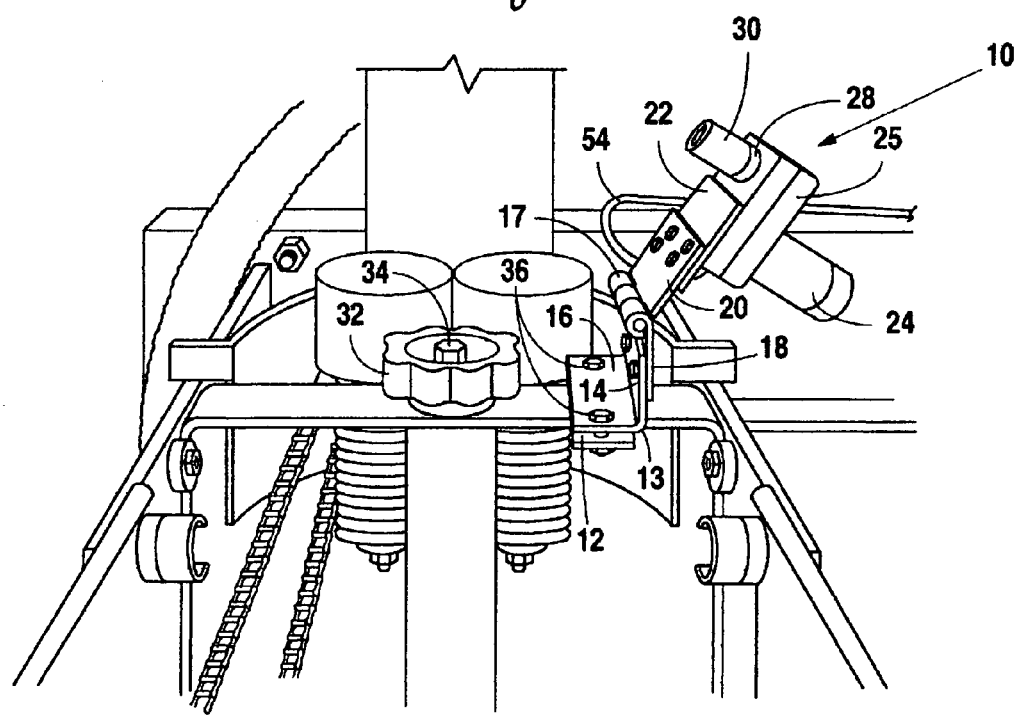
FIG. 2b. is a perspective view of the height adjustment apparatus of the present invention in a second, disengaged position.

FIG. 2a. is a perspective view of the height adjustment apparatus (10) of the present invention in a first, engaged position, while FIG. 2b. is a perspective view of the height adjustment apparatus (10) of the present invention in a second, disengaged position. Because it is advantageous to have a first position, wherein the gearmotor assembly (26) is engaged with the knob (32) of the height adjuster (A), and a second position, wherein the gearmotor assembly (26) is disengaged from the knob (32) of the height adjuster (A), a hinge (17) may be incorporated into the support assembly (21) of the present invention. The hinge (17) rotates about an axis at the pivot (34) allowing the connection fitting (30), or socket, to be engaged with the height adjustor (A) in the height adjustment apparatus' (10) first position, or swung to a second, disengaged position, without detaching the height adjustment apparatus (10) from the height adjustor (A) of the implement (I). This allows the gearmotor assembly (26) to pivot up and lift off of knob (32) to allow for manual adjustment of the height adjuster (A) by the user if desired.

Again, by way of specific example, a first embodiment of the present invention may have the second end of support member (22b) attached to the hinge second plate (20), where hinge (17) is a 2" to 5" heavy duty, door butt hinge. The hinge first plate (18) is attached to a bracket first side (14), where the bracket (13) may be 1-3"×1-3"×1/32-1/4" sized angle iron, 2-6" in length.

Regardless of the specific embodiment of the support assembly (21) of the present invention, the sizing and construction of the support assembly (21) must be such that it positions the gearmotor assembly (26) and connection fitting (30) such that they can be placed in a first position that is directly engaged with, or in mechanical communication with, the height adjuster (A) of the implement (I). Further, the first position allows activation of the gearmotor assembly (26) to activate the height adjuster (A) of the implement (I) to move up or down. Optimal results are generally obtained if the rotation of the connection fitting (30) is positioned where the plane of its rotation is perpendicular to the longitudinal axis of the height adjuster (A). Thus, the position of the gearmotor assembly (26) is generally optimally line with the height adjuster (A) of the implement (I), however the design of the implement (I) may make linear placement impossible and non-linear placement is also contemplated herein.

Again by way of specific example, the present invention may be incorporated onto an existing farm implement (I) by attaching the bracket second side (16) to the top side of a tillage implement (I). A strap plate (12) may be used on the bottom side of the implement (I) to pad pressure and abrasions exerted by the connectors (36), and better secure and support the height adjustment apparatus (10). The hinge first plate (18) is attached to the bracket first side (14) using connectors (36), while the hinge second plate (20) is attached to the support member (22) using connectors (36). Support member (22) is attached to gearmotor assembly (26) using connectors (36), often bolts and/or screws sized to engage the gearcase (25). The height adjustment apparatus (10) is positioned so as to align the connection fitting (30) with the knob (32).

Figure 3:
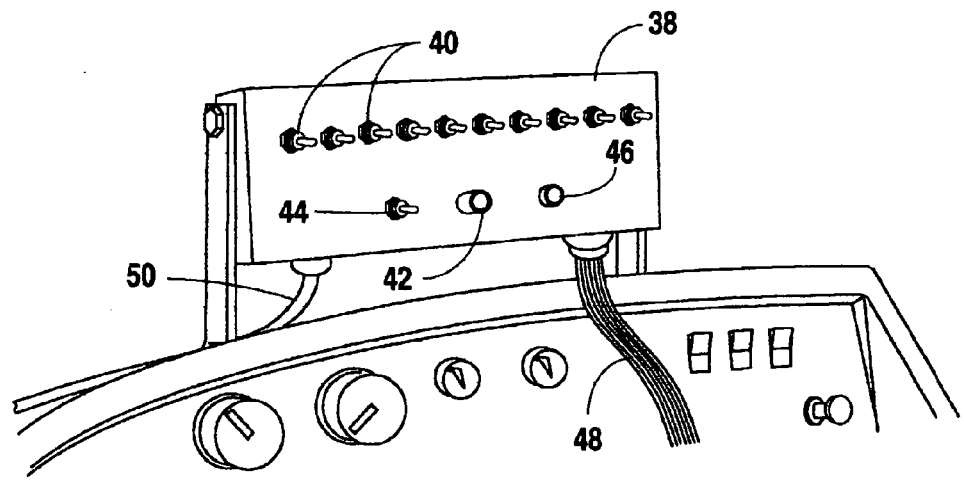
FIG. 3. is a perspective view an embodiment of the control box mounted in the cab of the tractor.

FIG. 3. is a perspective view an embodiment of the control box (38) mounted in the cab of the tractor (T). The control box may have a master power switch (44) and various indicators (42 and 46) in order to make the operation of the present invention more intuitive for the user. The indicators (42 and 46) may include a power indicator (42) showing whether the present invention currently has power supplied to it, and a status indicator (46) showing movement of the gearmotor assemblies (26). It is contemplated that there may be a plurality of status indicators (46), generally a number equal to the number of gearmotor assemblies (26). The status indicator (46) may differentiate between different states of the present invention. For example, the status indicator may be a light that turns red while the associated gearmotor assembly (26) moves the implement (I) downward, and turns green as it moves the implement (I) upward. As noted, the status indicator (46) may be a light, but could also take many other forms such an audible signal, other visual readouts, or any signaling device comprehendible by the user.

This figure also shows the control switches (40). In this embodiment, movement of each individual gearmotor assembly (26) is controlled by an individual control switch (40) with which it is in unique communication.

It is generally anticipated that a separate gearmotor assembly (26) will be installed for each row unit (U) on the implement (I), with a corresponding controller. This allows for more precise and customizable adjustment of the implement (I). However, it is also contemplated that a single control switch (40) can control a plurality of gearmotor assemblies (26).

A three position control switch (40) provides a neutral position where no movement is made by the gearmotor assembly (26), a first activated position where the gearmotor assembly (26) turns in a first direction so as to raise the height adjuster (A), and a second activated position where the gearmotor assembly (26) turns in a second direction so as to lower the height adjuster (A).

Pressure is provided to both of the downward and upward directions so that the row unit (U) can dig into the soil or raise from the soil as need be. The control switch (40) will cause movement of its corresponding height adjuster (A) regardless of whether the tractor (T) is moving or stationary.

Additionally, the amount of movement of the height adjuster downward in said first direction and upward in said second direction is scalable, in other words it will travel continuously while the control switch is activated so that the height of the row unit (U) is infinitely adjustable, limited only by the length, or limits, of said height adjuster.

A control cable bundle (48) extends beyond the figure and provides electronic communication from the control box (38) to the height adjustment apparatuses (10). A power cable (50) extends beyond the figure and is attached to a power source (not shown), generally the electrical system of the tractor (T), and provides power to the present invention.

FIG. 4. is a top view of an implement (I) hitched to a tractor (T), the implement (I) having multiple row units (U). As shown here, many farm implements (I) are "multi-row" type which require multiple height adjustment apparatuses (10) in order to be effective. This figure also gives a more complete illustration of the entire present invention. A power cable (50) connects the control box (38) to a power source (not shown). The control box (38) controls the height adjustment apparatuses (10) via communication along a control cable bundle (48). The control cable bundle (48) splits into individual control cables (56) that are connected to the gearmotor assemblies (26) and complete the communication from the control box (38). Because implements (I) are designed to be unhitched from the tractor (T), control cable bundle (48) is removably connectable to the control cables (56) via a first coupler (52) and a second coupler (54). When the first and second couplers (52 and 54) are connected, the control switch (40) is in operative communication with the gearmotor assembly (26). When the first and second couplers (52 and 54) are disconnected, the farm implement (I) can be unhitched from the tractor (T) allowing the farmer to use different implements (I) with a single tractor (T).

It is also anticipated that the communication between the control switch (40) and the gearmotor assembly (26) can be via wireless means, such as radio signal, microwave, infrared, audio, visual, hydraulic, or like means, in place of the control cable (56) of the illustrated embodiment.

Figure 5:
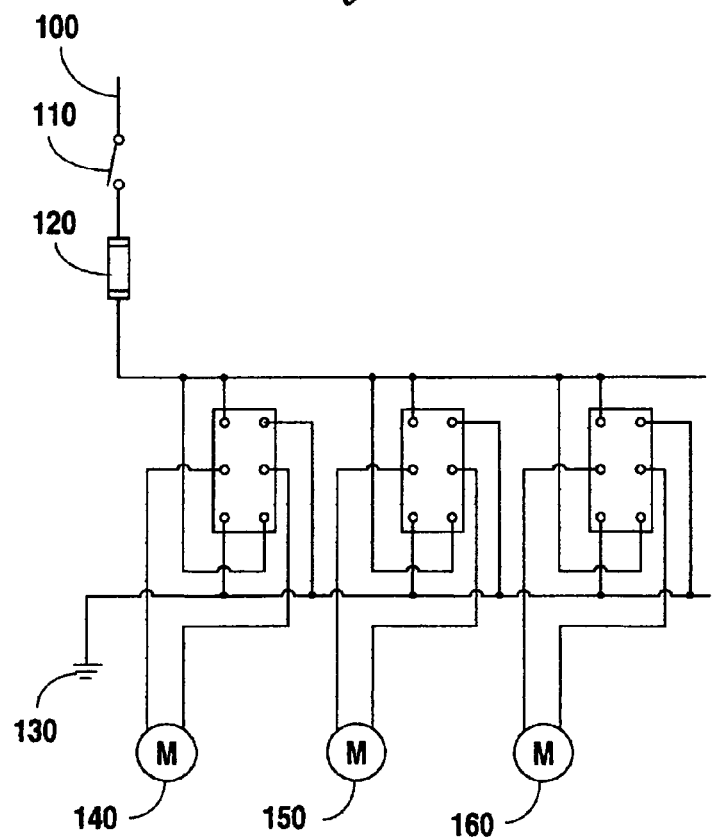
FIG. 5. is a wiring diagram for the present invention.

FIG. 5. is a wiring diagram for the present invention. A power source (100) is connected to a switch (110) which controls power on/off to a fuse block (120). In turn, power is provided to each parallel gear motor, shown here as first gear motor (140), second gear motor (150), and third gear motor (160). Ground (130) completes the circuit. This figure illustrates that there can be more than one height adjustment apparatus (10) of the present invention placed in parallel in order to match up with multiple row planters of the implement (I). While such a multi-unit embodiment is anticipated for multiple row planters or farm implements, it is also contemplated herein that a single controller could be used to control multiple gearmotor assemblies (10).

Figure 6:
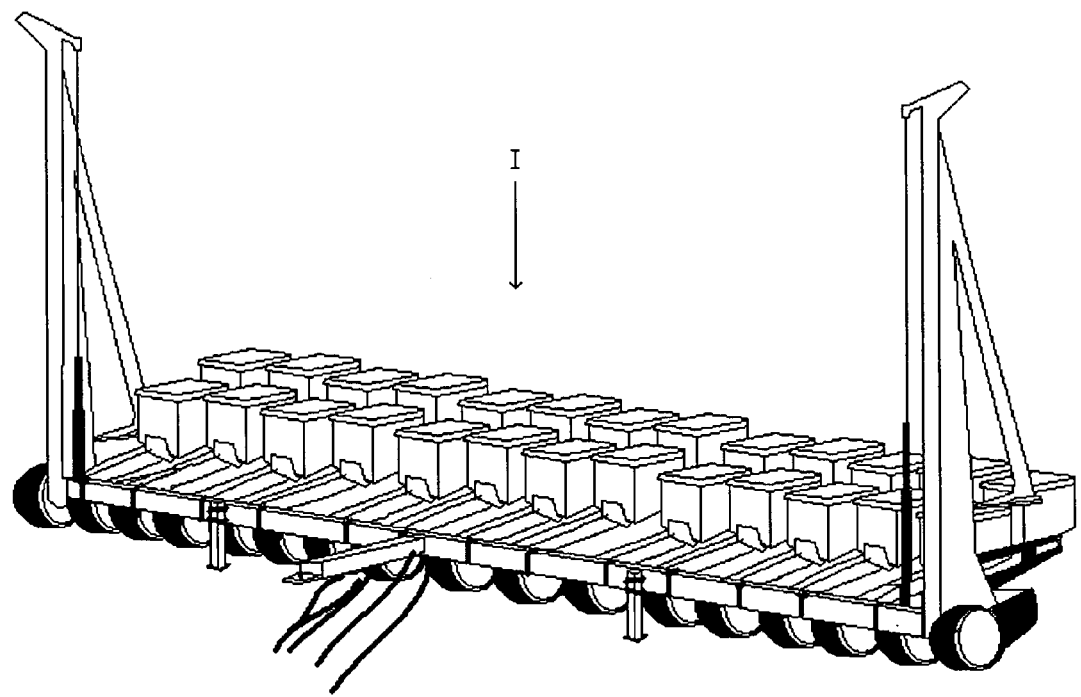
FIG. 6. is a depiction of a representative implement.

FIG. 6. is a depiction of a representative implement (I). It is a picture of a John Deere 7300 Maxemerge II Planter (I) with v-wings (U), which is used as an example of the type of implement (I) with which the height adjustment apparatus (10) may be used.

Figure 7:
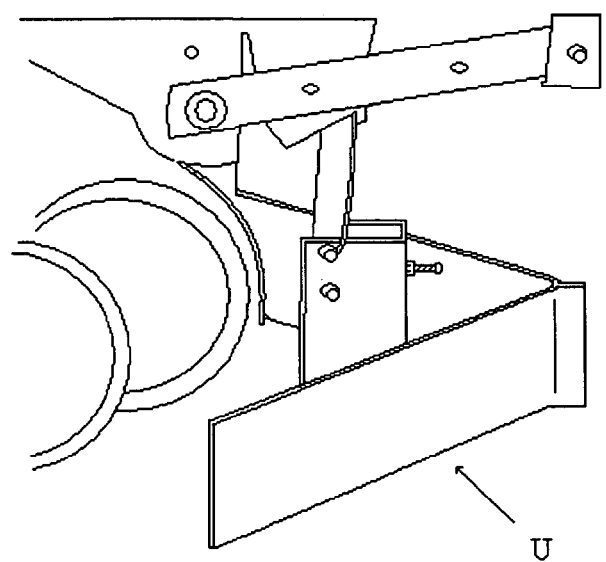
FIG. 7. is a depiction of a representative row unit.

FIG. 7. is a depiction of a representative row unit (U). Row units (U) may be adjusted to a desired height by the user in the tractor (T) individually or as a group, and while the user is riding on the tractor (T) and the tractor (T) is moving.

Figure 8:
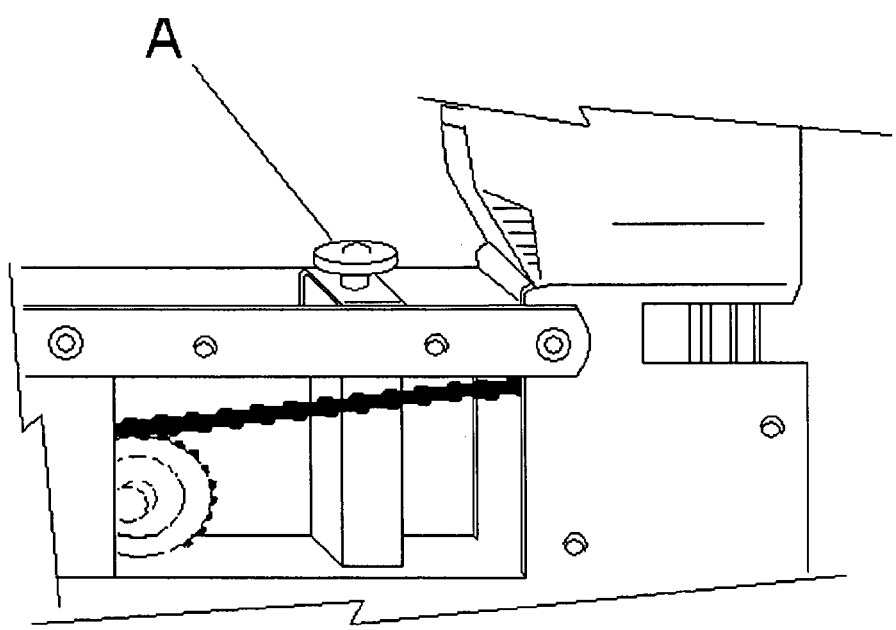
FIG. 8. is a depiction of the tillage support bracket and adjustment knob.

FIG. 8. is a depiction of the tillage support bracket and adjustment knob (32).

FIG. 9. is an exploded view of a representative height adjuster (A). The individual parts are labeled with their part numbers, however these refer to the manufacturer's designation and are representative as related to the present invention. The parts of the representative height adjuster (A) are set forth below in Table 1.

TABLE 1

| PART NO. | PART NAME | QTY | SERIAL NO. OR YEAR | REMARKS |
|---|---|---|---|---|
| 19M7387 | CAP SCREW | 2 | | M12 × 40 |
| A42895 | SPACER | 2 | | |
| A31867 | LOCK NUT | 4 | | |
| 34M7172 | SPRING PIN | 1 | | 6 × 30 MM |
| A52177 | KNOB | 1 | -MARCH 2003 | |
| A75286 | KNOB | 1 | MARCH 2003- | |
| A52459 | DETENT | 1 | -MARCH 2003 | |
| A75509 | DETENT | 1 | MARCH 2003- | |
| AA37372 | SUPPORT | 1 | | |
| JD7797 | LUBRICATION FITTING | 1 | | |
| B32630 | SPRING LOCKING PIN | 2 | | |
| A52205 | PIN | 1 | | |
| 19M7414 | CAP SCREW | 1 | -APRIL 1998 | M12 × 90 |
| 19M8122 | CAP SCREW | 1 | APRIL 1998- | M12 × 85 |
| 19M7189 | CAP SCREW | 1 | | M12 × 80 |

TABLE 1-continued

| A52199 | ROD | 1 | |
|---|---|---|---|
| AA37188 | TUBE | 1 | |
| A52194 | STUD | 1 | |
| A52548 | SPACER | 1 | |
| A52168 | SIGN | 1 | |
| 24M7053 | WASHER | 1 | 17 × 30 × 3 MM |
| BA25852 | COMPLETE GOODS/SHIP. BUNDLE | 1 | ROW TILLAGE SUPPORT BRACKET |

The present invention, as shown in the figures and described in the specific examples, was engineered for a John Deere 7300 Maxemerge II Planter with v-wings, however the invention may be configured for any of the various manufacturers' planters, scrapers, and height adjusters. Other applications will require different mounting methods, yet the concept remains the same. Examples include John Deere implements such as most disks, chisels, field cultivators, as well as other manufacturers' implements.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An apparatus for adjusting the height of a row unit having a height adjuster of an implement remotely from a tractor, comprising:
   a support assembly attachable to said implement;
   a gearmotor assembly mounted on said support assembly; and
   wherein said support assembly rotates about a pivot so that said gearmotor assembly may be positioned in a first position so as to be engaged with said height adjuster, and a second position so as to be disengaged with said height adjuster.

2. The apparatus of claim 1, further comprising:
   a control switch on said tractor, wherein said control switch is in communication with said gearmotor assembly;
   wherein said control switch a neutral position that causes said gearmotor assembly to not move, a first activated position that causes said gearmotor assembly to move said height adjuster in a first direction, and a second activated position that causes said gearmotor assembly to move said height adjuster in a second direction.

3. The apparatus of claim 2, wherein said first direction is downward and downward pressure is provided, and said second direction is upward where upward pressure is provided.

4. The apparatus of claim 2, further comprising:
   a plurality of said control switches,
   a plurality of gearmotor assemblies; and
   wherein each individual control switch is in unique communication with an individual gearmotor assembly.

5. The apparatus of claim 2, further comprising:
   a plurality of gearmotor assemblies; and
   wherein said control switch control said plurality of said gearmotor assemblies.

6. The apparatus of claim 2, wherein said control switch will cause movement of said height adjuster regardless of whether said tractor is moving or stationary.

7. The apparatus of claim 2, wherein said the amount of movement in said first direction and in said second direction is scalable and limited only by the limits of said height adjuster.

8. The apparatus of claim 2, further comprising a power source.

9. The apparatus of claim 2, wherein said power source is said tractor.

10. The apparatus of claim 1, wherein said gearmotor assembly further comprises:
    a motor in operation communication with a gear case;
    a gearmotor output shaft operatively attached to said gear case; and
    wherein movement of said motor is translated to rotational movement of said gearmotor output shaft.

11. The apparatus of claim 10, wherein said gearmotor assembly further comprises a connection fitting connected to said gearmotor output shaft, wherein said connection fitting is removably engageable with said height adjuster.

12. The apparatus of claim 11, further comprising a locking device operative with said connection fitting, wherein said locking device helps prevent unintentional disengagement of said connection fitting from said gearmotor output shaft.

13. The apparatus of claim 2, wherein the speed of movement of said height adjuster in said first direction, and in said second direction, may be adjusted.

14. The apparatus of claim 2, wherein said control switch is graduated so as to allow increasing or decreasing speed in either said first direction, or in said second direction.

15. The apparatus of claim 2, wherein said first direction is downward, and said second direction is upward.

16. The apparatus of claim 2, wherein said communication is wireless.

* * * * *